United States Patent [19]

Holzer

[11] 3,733,916
[45] May 22, 1973

[54] DEVICE TO SLOW DOWN A MECHANICAL STEP DRIVE

[75] Inventor: Walter K. Holzer, Meersburg, Germany

[73] Assignee: Holzer Patent AG, Zug, Postrasse, Switzerland

[22] Filed: June 17, 1971

[21] Appl. No.: 154,075

[30] Foreign Application Priority Data

June 17, 1970 Switzerland..........................9166/70

[52] U.S. Cl. .......................74/125, 74/572, 188/266
[51] Int. Cl...............................................F16h 29/00
[58] Field of Search..............................74/125, 572; 188/266

[56] References Cited

UNITED STATES PATENTS

| | | |
|---|---|---|
| 554,577 | 2/1896 | Brink..................................188/266 |
| 1,044,505 | 11/1912 | Dragon................................188/266 |
| 2,064,452 | 12/1936 | Watson ................................74/572 |
| 2,432,383 | 12/1947 | Colwell ................................74/572 |
| 2,704,416 | 3/1955 | Laird....................................74/572 |
| 2,868,026 | 1/1959 | Finehout et al. ....................74/125 |
| 3,028,458 | 4/1962 | Strathearn et al....................74/125 |

*Primary Examiner*—Charles J. Myhre
*Assistant Examiner*—Wesley S. Ratliff, Jr.
*Attorney*—Watson, Cole, Grindle & Watson

[57] ABSTRACT

A device for the slowing down of a mechanical step drive, especially for use in electric automatic cycle operations, wherein the speed of a conveying movement element is decreased by means of a flywheel so that a continued turning of a control element disc is substantially prevented thereby beyond a predetermined conveying step of said element.

5 Claims, 1 Drawing Figure

PATENTED MAY 22 1973　　　　　　　　3,733,916
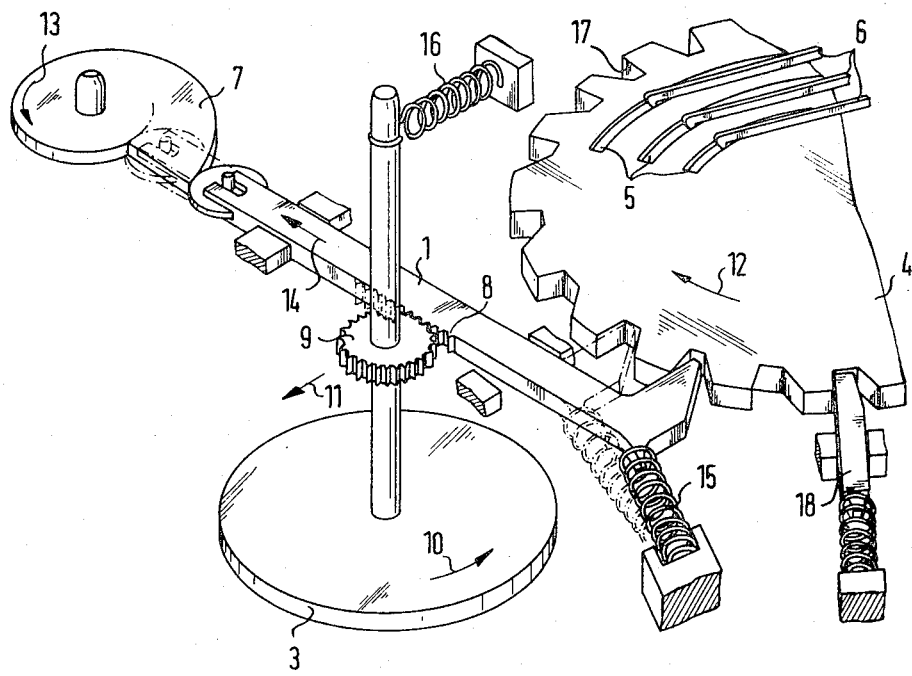
INVENTOR:
WALTER K. HOLZER
BY:
Watson, Cole, Grindle &
Watson

DEVICE TO SLOW DOWN A MECHANICAL STEP DRIVE

The invention relates to a device to slow down a mechanical step drive, especially for use in step-by-step switching systems.

Known step conveying mechanisms have a number of shortcomings. In the step-by-step switching mechanisms, it is necessary to maintain the step length precisely in order to carry out the conveying steps. Insofar as the conveying arrangement is used in an automatic cycle operation, nonconformance with precise step lengths will cause the switches, which are influenced by a cam disk or roller, to operate inaccurately. The consequence of this may be either that the contact surfaces will quickly burn up prematurely or that the program stored in the cam switch will not be maintained precisely. Quite frequently the program roller or disk is accelerated so strongly that it moves somewhat further than would correspond to the actual program step. Such is known as "overcentrifuging" of the program switch disk. This effect stems above all from the acceleration of the mass which cannot be decelerated quickly enough. Although it is possible to use a positive contact fit between conveying toothing and latch, a further turning of the cam disk by hand is not thereby made possible.

Therefore, it is the object of the present invention to effectively avoid from the outset an overcentrifuging of the control element (for example, the roller or disk) by means of additional measures. At the same time, an additional elastic lock is to be built in for an absolute suppression of the overcentrifuging, which will limit the control element in its movement in the event a small overcentrifuging movement remains but which, at the same time, will insure continued turning of the control element by hand.

According to the invention, the above-mentioned objects are achieved by decreasing, by means of a flywheel and its bearing, the speed of the conveying movement of a kinematic movement and by preventing an undesirable continued turning of the control element beyond a definite conveying step.

According to one aspect of the invention, the conveying element, for example, a conveying latch and/or a lock latch, positively engage with the conveying toothing of the control element.

According to another aspect of the invention, the conveying latch has teeth which engage with a toothed flywheel.

A further aspect of the invention provides, after completion of a conveying step, that the conveying latch teeth and flywheel teeth will disengage.

According to still another aspect of the invention, the flywheel teeth are pressed resiliently against the teeth of the conveying latch.

According to still another aspect of the invention the wheel has been equipped with vanes or impeller blades.

The invention will now be described with reference to the drawing which is a perspective of the device in accordance with the present invention.

The object of the invention is described by way of a linearly movable conveying latch. However, the invention also can be applied to other step drives, such as, for example, to driven conveying latches or similar elements.

An automatic cycle switching disk 4 which carries either cams or slots 5 scanned by scanning levers 6 which in turn are constituent parts of switches, is to be moved by a conveying latch 1 step-by-step as an embodiment by way of example for a control element. The conveying latch 1 is initially stressed by a tightening disk 7 which turns in the direction of arrow 13 opposite to the spring force of a compression spring 15 in a manner known per se. As soon as the tightening disk 7 releases conveying latch 1, the latter is immediately moved (as shown in phantom) with the aid of compression spring 15 in the direction of arrow 14 whereby the conveying step of the automatic cycle switch disk 4 may be carried out.

Conveying latch 1 at the same time is provided with ratchet teeth 8 which, in the position shown in full lines in the FIGURE, is in engagement with a toothed wheel 9 of a freely rotatable flywheel 3. During the conveying step carried out by means of the conveying latch 1, flywheel 3 is caused to rotate by means of teeth 8 and wheel 9 in the direction of arrow 10. Ratchet teeth 8 on the conveying latch 1 has been disposed thereon in such a manner and is of such a length that, just prior to completion of the conveying step, teeth 8 will be disengaged from wheel 9 of flywheel 3. As a result, the accelerated wheel 3 can run down freely.

If teeth 8 and wheel 9 are not properly intermeshed at the time conveying latch 1 is again prestressed by rotation of disk 7, the axle of flywheel 3 is movably mounted with the aid of a tension spring 16, to avoid this difficulty, in such a way that flywheel 3 will move in the direction of arrow 11. In such way, tension spring 16 will cause teeth 8 and wheel 9 to be effectively pressed against one another. As is clearly evident from the drawing, spring 16 is mounted on the axle rod of flywheel 3 at a peripheral groove provided thereon so that the axle rod may slidably rotate relative to spring 16.

Flywheel 3 will slow down the conveying movement of conveying latch 1 in that, the flywheel, upon starting to rotate in the direction of arrow 10, has a certain mass inertia and, moreover, the bearing losses of flywheel 3 must be overcome. It should be noted that flywheel 3 may be provided with impeller blades so that air resistance may also be utilized.

In the FIGURE, it can be seen that conveying latch 1 is forced simultaneously into gear teeth 17 of the automatic cycle switch disk 4 by means of the compression spring 15.

If the slowdown function of flywheel 3 is not completely sufficient, the cam paths or slots 5, located on the automatic cycle switch disk 4, will not operate the scanning levers 6 of the switches with precision. To avoid this, a positive contact fit is provided between gear teeth 17 of the automatic cycle cam disk 4 and conveying latch 1. Therefore, if cam disk 4, upon completion of the conveying step, should still tend to move a little further, such will be effectively prevented by the positive contact fit between latch and cam disk. In addition to such measure, a lock 18 also may form a positive contact fit with gear teeth 17. As a result, the arresting sensation will be improved upon continued turning of the automatic cycle switch disk 4. A unique advantage of the device herein is that, despite the positive contact fit between conveying latch 1 or lock 18 and conveying gear teeth 17 of the automatic cycle switch disk 4, such will not prevent a manual turning, if necessary, of the automatic cycle switch disk 4 in the direction of arrow 12.

In lieu of tension spring 16 a pressure spring may be used.

As compared to known arrangements, the step speed made possible by the present invention may be predetermined by selection of the size (or mass or shape) of the flywheel as well as by the corresponding bearing selection of the flywheel. It has been found that even with the use of a very large mass of the control element, no overcentrifuging will occur. Through use of the flywheel, the conveying noise of the step drive will be considerably decreased. Any overcentrifuging can be prevented in accordance with the present design even if a relatively large spring force is used to carry out the conveying step. Moreover, the use of the additional accelerated mass of the flywheel insures that additional wear of the trailing edges of the conveying latch ratchet teeth remains smaller than if only a positive contact fit were used between conveying element 1 and separate ratchet teeth in the conventional manner. The vibration of the switch contacts operated by the automatic cycle switch disk 4 will be considerably limited by the fact that its speed is decreased after the starting of the automatic cycle switch disk. Since, indeed, no automatic cycle contacts are operated often at the beginning of the switching step but normally take place thereafter, known step switching arrangements used in automatic cycle operations achieve excessive speeds at the beginning. If the contacts are switched during such high speeds, vibration cannot be avoided. With the present arrangement, however, the inclination for vibration, and as mentioned previously, will be considerably decreased.

What is claimed is:

1. Device for the slowing down of a mechanical step drive, especially for use in electric automatic cycle operations, in which an automatic cycle switch disc is provided, comprising a conveying latch spring biassed for axial movement in one direction, means for moving said latch to a predetermined extent for axial movement in another direction opposite said one direction, said latch cooperating with gear teeth provided on said disc for turning same during movement of said latch in said one direction, a flywheel mounted on a rod for rotation about the rod axis perpendicular to the movement of said latch, means on said rod in engagement with said latch for causing rotation of said flywheel in opposite directions during movement of said latch in said one and said another directions, respectively, whereby said flywheel serves to decrease the speed of the conveying movement of said latch as said flywheel changes its direction of rotation when said latch commences its axial movement in said one direction, thereby substantially preventing continued rotation of said disc beyond a predetermined conveying step as determined by said predetermined movement of said latch.

2. The device according to claim 1 wherein a lock latch is provided for interengaging with said gear teeth thereby further preventing said continued rotation of said disc.

3. The device according to claim 1 wherein said latch is provided with ratchet teeth, and wherein said means on said rod comprises a gear wheel arranged to intermesh with said ratchet teeth.

4. The device according to claim 3 wherein said ratchet teeth are provided along a predetermined length of said latch and are so disposed therealong that, after completion of said conveying step, said ratchet teeth and said gear wheel become disengaged.

5. The device according to claim 4 wherein means are provided on said rod for pressing said gear wheel against said ratchet teeth.

* * * * *